US008474240B1

(12) United States Patent  (10) Patent No.: US 8,474,240 B1
Nail  (45) Date of Patent: Jul. 2, 2013

(54) REGENERATIVE GAS GENERATOR

(71) Applicant: NW Licensing Company LLC, Evanston, IL (US)

(72) Inventor: Charles Robin Nail, Portland, OR (US)

(73) Assignee: NW Licensing Company LLC, Evanston, IL (US)

( * ) Notice: Subject to any disclaimer, the term of this patent is extended or adjusted under 35 U.S.C. 154(b) by 0 days.

(21) Appl. No.: 13/706,345

(22) Filed: Dec. 5, 2012

Related U.S. Application Data

(60) Provisional application No. 61/682,087, filed on Aug. 10, 2012.

(51) Int. Cl.
*F02C 7/10* (2006.01)
*F02G 1/00* (2006.01)

(52) U.S. Cl.
USPC ........ 60/39.511; 431/215; 431/245; 422/204; 422/206; 422/621; 422/630

(58) Field of Classification Search
USPC ........ 60/39.12, 39.511, 723, 730, 777; 431/2, 431/4, 5, 10, 11, 215, 245, 258, 346, 347; 422/202, 203, 204, 206, 600, 621, 630, 631, 422/638, 643, 644
See application file for complete search history.

(56) References Cited

U.S. PATENT DOCUMENTS

| | | | |
|---|---|---|---|
| 2,862,482 A | 12/1958 | Hart | |
| 3,238,991 A * | 3/1966 | Goldmann et al. | 431/11 |
| 3,777,728 A | 12/1973 | Reiche | |
| 3,958,538 A | 5/1976 | Hoshino | |
| 3,969,899 A | 7/1976 | Nakazawa et al. | |
| 3,980,064 A * | 9/1976 | Ariga et al. | 123/457 |
| 3,985,107 A | 10/1976 | Ueno et al. | |
| 4,004,413 A | 1/1977 | Ueno et al. | |
| 4,004,554 A | 1/1977 | Kosaka et al. | |
| 4,040,252 A * | 8/1977 | Mosier et al. | 60/804 |
| 4,047,380 A | 9/1977 | Heffernan | |
| 4,056,086 A | 11/1977 | Ueno et al. | |
| 4,222,351 A | 9/1980 | Kosaka et al. | |
| 4,500,500 A * | 2/1985 | Paalman et al. | 423/224 |

(Continued)

FOREIGN PATENT DOCUMENTS

| | | |
|---|---|---|
| GB | 832771 A | 4/1960 |
| GB | 837497 A | 6/1960 |
| GB | 870854 A | 6/1961 |
| GB | 1426808 A | 3/1976 |

*Primary Examiner* — Ehud Gartenberg
*Assistant Examiner* — Michael B Mantyla
(74) *Attorney, Agent, or Firm* — Drinker Biddle & Reath LLP

(57) ABSTRACT

Systems, methods, and computer program products are disclosed that overcome the deficiencies of traditional steam engines and internal combustion engines. In an embodiment, a system is disclosed for generating reaction products having elevated temperature and pressure. The system comprises a first chamber including a reactor to decompose hydrogen peroxide to generate oxygen and water vapor. The system further comprises a second chamber including a reactor to catalytically combust a mixture of the generated oxygen and a fuel to generate reaction products having elevated temperature and pressure. The system further comprises a passageway to receive reaction products exiting the second chamber and to channel the reaction products to come into contact with external surfaces of the first and second chambers to thereby transfer heat to the first and second chambers, and an outlet to allow the reaction products to exit the system.

21 Claims, 9 Drawing Sheets

U.S. PATENT DOCUMENTS

| | | | |
|---|---|---|---|
| 4,698,965 A * | 10/1987 | Delchev et al. | 60/227 |
| 5,177,952 A * | 1/1993 | Stone | 60/775 |
| 5,339,634 A * | 8/1994 | Gale et al. | 60/723 |
| 5,401,589 A * | 3/1995 | Palmer et al. | 429/408 |
| 5,477,672 A * | 12/1995 | Tsujikado et al. | 60/39.462 |
| 5,771,847 A | 6/1998 | Duva | |
| 5,924,411 A | 7/1999 | Guettle et al. | |
| 6,837,759 B2 * | 1/2005 | Van-Drentham Susman | 440/45 |
| 2007/0084423 A1 | 4/2007 | LeBeaux | |
| 2011/0136663 A1 * | 6/2011 | Schremmer et al. | 502/406 |
| 2012/0285175 A1 * | 11/2012 | Fletcher et al. | 60/775 |

\* cited by examiner

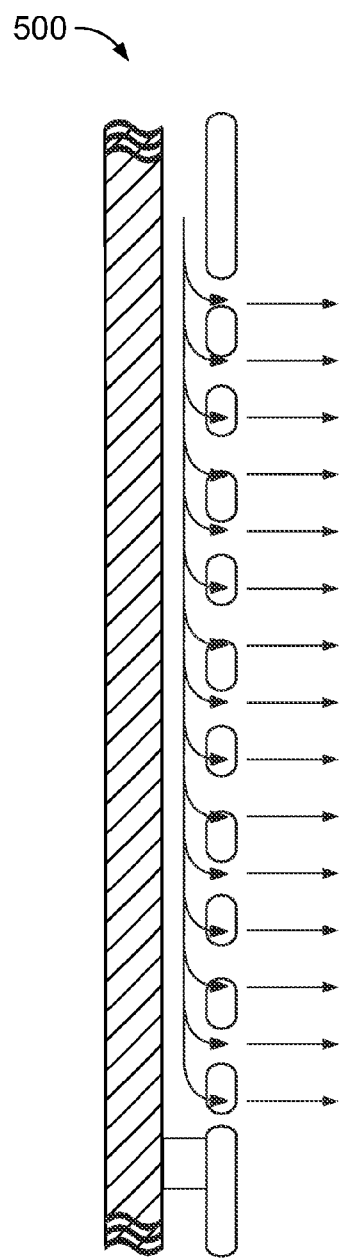 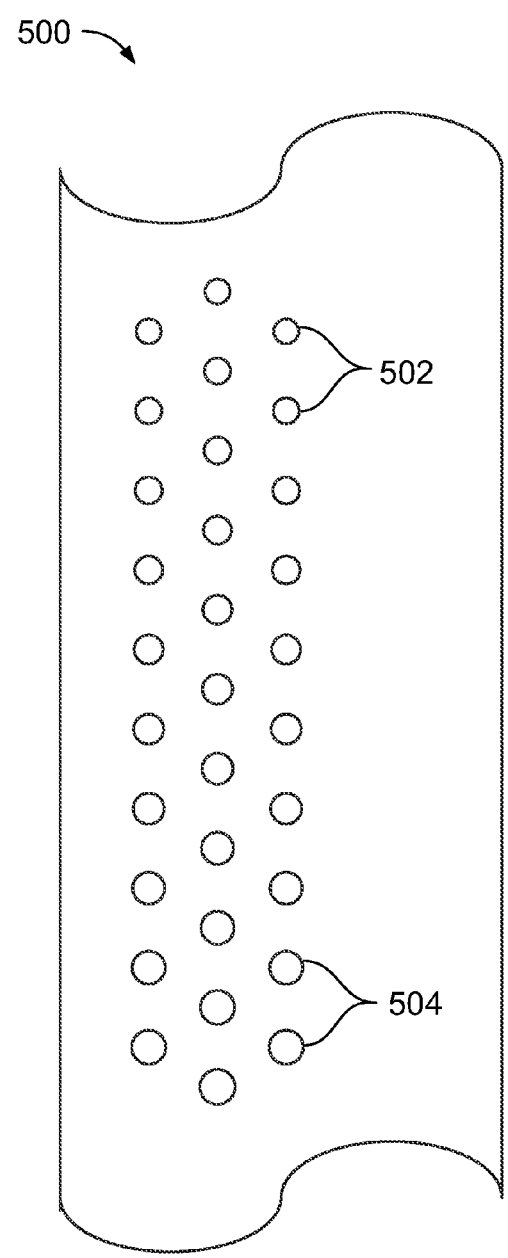
FIG. 5A  FIG. 5B

REGENERATIVE GAS GENERATOR

CROSS-REFERENCE TO RELATED APPLICATION

This application claims the priority benefit of U.S. Provisional Patent Application No. 61/682,087 entitled "REGENERATIVE GAS GENERATOR AND EXPANSION ENGINE SYSTEM" and filed on Aug. 10, 2012, which is hereby incorporated herein by reference in its entirety.

BACKGROUND

1. Field

The disclosed embodiments relate to the field of power generation based on combustion of a fuel.

2. Related Art

Traditional systems and methods for generating power based on combustion of a fuel suffer from a number of drawbacks.

A traditional internal combustion engine (ICE), for example, generates more heat than it effectively can convert to mechanical work. An undesirable side effect is that its components will be damaged by high temperatures unless the heat is removed by an air or liquid cooling system. In typical ICE automotive applications 15% of the fuel energy is lost through the radiator alone. Moreover, about 80%-87% of the chemical energy in fuel is wasted overall in ICEs, mostly as hot gases and un-burnt fuel vented from the exhaust stream. This corresponds to an energy utilization of typically 13% (urban driving) or 20% (highway driving) of the fuel energy reaching the axle.

ICE technology produces low torque at low speed which leads to a scale mismatch between time averaged power utilization and on demand low speed performance requirements. An oversized engine is required to compensate, enabling adequate low speed functionality. It also requires a complicated power transmission system and gear box to provide adequate torque throughout the useful operating range. The combination of an oversized engine and the mechanical inefficiencies of the power transmission system contribute to the inefficient use of energy.

Modern ICE technologies also require processing exhaust gases with a catalytic converter to remove unburned fuel, nitrous oxides (NOx), and soot before being released to the atmosphere. Converter backpressure actively robs mechanical energy from the engine. It also represents an opportunity loss by the fact that heat and vapors generated in the converter aren't harnessed for productive work. In an automobile a hot catalytic converter presents a fire hazard for combustible debris under a vehicle and so contributes to the rate of accidental automobile fires. Typically exhaust heat and subsequent chemical reactions heat the catalyst interior to greater than 700° F., spilling the waste heat to the ambient air through the converter walls and out the tailpipe. Further, in an ICE, air must be compressed before combustion is possible. Useful energy production from the expanding gases is diminished by their compression. Net productivity effectively results only from the incremental gas product formed by combustion.

SUMMARY

Systems, methods, and computer program products are disclosed that overcome the deficiencies of traditional approaches to power generation discussed above.

In an embodiment, a system is disclosed for generating reaction products at elevated temperature and pressure. The system comprises a first and second chamber. The first chamber comprises an inlet to receive hydrogen peroxide, a reactor to decompose the hydrogen peroxide to generate oxygen and water vapor, and an outlet to allow the generated oxygen and water vapor to exit the first chamber. The second chamber comprises a first inlet to receive the oxygen and water vapor from the first chamber, a second inlet to receive a fuel, a reactor to catalytically combust the mixture of the oxygen and fuel to generate reaction products having elevated temperature and pressure, and an outlet to allow the reaction products to exit the second chamber. The system further comprises a passageway to receive reaction products exiting the second chamber and to channel the reaction products to come into contact with external surfaces of the first and second chambers to thereby transfer heat to the first and second chambers, and an outlet to allow the reaction products to exit the system.

In a further embodiment, a method is disclosed for power generation. The method includes decomposing hydrogen peroxide in a first chamber to generate oxygen and water, and combining the generated oxygen and water vapor with a fuel in a second chamber to generate a fuel/oxygen/water mixture. The method further includes catalytically combusting the mixture in the second chamber to generate reaction products having elevated temperature and pressure, allowing the generated reaction products to exit the second chamber, and channeling the generated reaction products that exit the second chamber to come into contact with external surfaces of the first and second chambers to thereby transfer heat to the first and second chambers. Lastly, the method includes providing the generated reaction products to an expansion engine to thereby generate mechanical power based on the elevated temperature and pressure of the reaction products. Carrying out this method generates a sustained power supply, wherein the heat transferred to the first chamber acts to heat the hydrogen peroxide to help drive the decomposition of the hydrogen peroxide and vaporize the water, and heat transferred to the second chamber acts to heat the fuel/oxygen/water mixture to help drive the combustion of the fuel/oxygen/water mixture.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

FIG. 5A illustrates a cross sectional view of a vent hole array that is part of the heater module of FIG. 2B, according to an embodiment.

FIG. 5B illustrates a facing view of a vent hole array that is part of the heater module of FIG. 2B, according to an embodiment.

Figure 1:
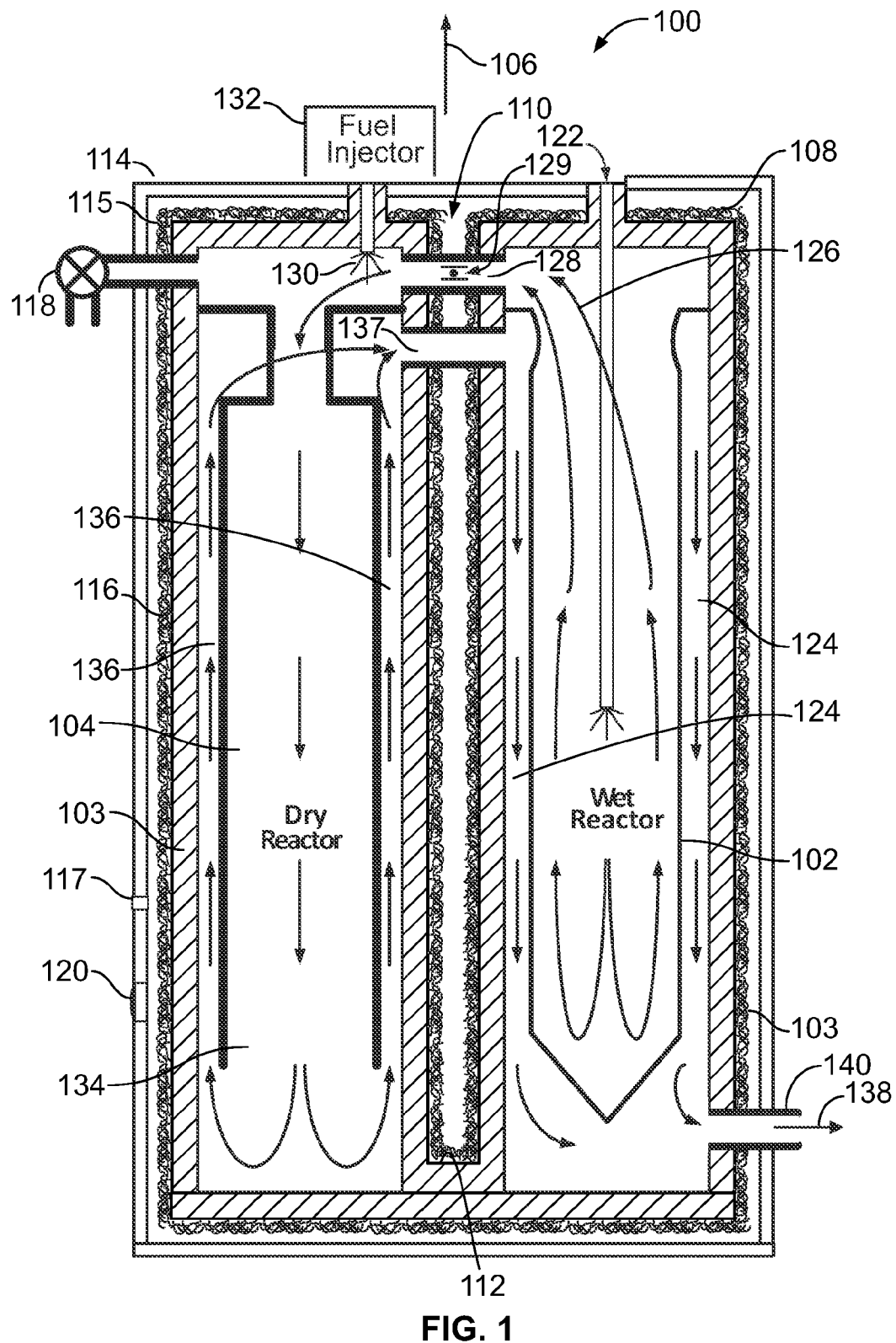
FIG. 1 illustrates a cross section view of a system comprising two reaction chambers, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

It is to be appreciated that any additional disclosure found in the Figures is meant to be exemplary and not limiting to any of the features shown in the Figures and described in the specification below.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Overview

The regenerative gas generator system described herein comprises two main chambers, first a wet reactor for the generation of oxygen by the decomposition of hydrogen peroxide and second a dry reactor for the subsequent catalytically induced combustion of a fuel (e.g., a carbon or nitrogen based fuel) with the oxygen produced by the wet reactor. Both reactors are collocated in close proximity and nested within a common insulated shroud. Heat product in the form of hot steam from the dry reactor regeneratively bathes the liquid jacket in the wet reactor to facilitate complete evaporation of residual input dilution water in the peroxide mix. Thereafter the hot pressurized steam exits the generator system and is available for various practical applications. The purpose of the generator system is to provide a continuous supply of high pressure steam subsequently harnessed for mechanical power generation by an expansion engine or for other purposes utilizing a continuous steam source.

While operating at less than full operating temperature either at startup or under extreme cold conditions, the generator is provided with less water in the peroxide mixture so more heat can be used to warm the components rather than only being used for steam production. Both higher concentration of peroxide and supplemental heating are provided to raise the temperature of the catalyst in the dry chamber to the "light off temperature," the minimum temperature to support catalyzed combustion. As the engine approaches full operating temperature supplemental heating decreases and the fuel concentration can contain more water, providing more vapor (and correspondingly more mechanical work product) per unit fuel consumption.

The fuel, for instance a (carbon or nitrogen based) fuel such as gasoline, may be injected into the dry reactor by a commercial high pressure electronic fuel injector where it mixes with the oxygenated steam from the wet reactor. The instantaneous optimum quantity of fuel is varied by the injector duty cycle under electronic control. The correct amount is determined by a fast response oxygen concentration sensor located downstream of the dry reaction chamber, placed as close as possible to the end of the catalytic stack designed to combust the fuel. Both the input peroxide concentration and fuel injection rate are controlled by an electronic control unit (ECU) using the oxygen concentration sensor 254, mass flow sensor 129, various temperature sensors 244, 246, 247 and pressure sensors 248, 250, and actuated flow valves (not shown).

This specification describes embodiments of the gas generator, unique features of the technical approach, and system design considerations. This system is designed to maximize the generated amount of pressurized reaction products for a given quantity of carbon or nitrogen based fuel using all the gas products plus the added steam vaporized from the water/peroxide mix.

Decomposition of the hydrogen peroxide is segregated from the combustion of the fuel by the use of two reaction chambers (to be described further below). The first chamber is used for the decomposition of the hydrogen peroxide into oxygen and water and for the evaporation or any residual water. Accordingly it is called the "wet reactor." The hydrogen peroxide decomposes spontaneously in the presence of catalysts and under sufficiently high temperature:

$$2H_2O_2(l) \rightarrow 2H_2O(l) + O_2(g) + \text{Heat}$$

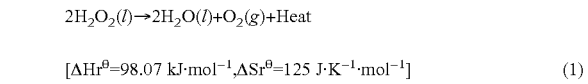

The combustion of a fuel with the oxygen produced by the wet reactor is isolated in the second reactor, correspondingly called the "dry reactor." A fuel such as kerosene or gasoline catalytically is reacted in the dry reactor (n-octane in the following example):

$$C_8H_{18}(g) + (12\tfrac{1}{2})O_2(g) \rightarrow 8CO_2(g) + 9H_2O(g) + \text{Heat}$$

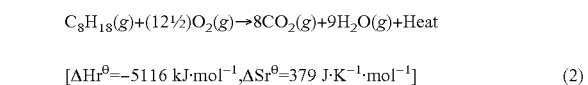

Catalysts are used to make both reactions progress faster. Catalysts accelerate the reaction kinetics by providing a lower activation energy path, increasing the rate of reaction without changing the heat yield (Hess's Law). The catalyst plus sufficiently high operating temperatures accelerate these reactions, enabling them to occur whilst traversing a small reactor.

Within the dry reactor lower temperatures support catalyzed combustion than would be required without the catalysts. Lower temperatures and lower fuel/oxidizer concentration both lower the risk of detonation or premature combustion considerably, more so together, facilitating combustion to occur when and where intended, as the reactants contact the surfaces of the catalyst material. These effects make the process control window larger and reduce soot production associated with incomplete combustion.

Because the temperature of the vapors coming from the wet reactor is low, near the boiling point of water, additional heat is needed to raise the temperature in the dry reactor to the light off temperature to combust the fuel. Initially this heat may be provided by a heater module within the dry reactor until the dry reactor catalyst and other components are sufficiently hot enough to sustain the fuel combustion without auxiliary heating.

High temperature and pressure are standard operating conditions for the reactor. Both contribute to the efficiency of the chemical processes, sufficient temperature in particular ensuring the chemistry goes to completion. Because of its relatively small size, the reactor does not store as much energy at any instant as a steam boiler would because of its excessive size. Regardless, overpressure devices should be present to protect this device from overpressure conditions.

Integration of the catalytic converter with the reactor increases efficiency. Both the added heat and vapor production contribute to the improvement. This is in contrast to the conventional catalyst placement within the exhaust system of an internal combustion engine after the mechanical energy already has been harvested.

Discussion of Embodiments

FIG. 1 illustrates a cross section view of an embodiment system 100 comprising two reaction chambers 102 and 104. The chambers 102 and 104 are generally cylindrically shaped and aligned with a nominally vertical axis 106. There is a fairly tolerant but preferred up direction corresponding to the axis 106. The two chambers, 102 and 104, are pressure vessels 103 that share a common top end cap 108 and yoke 110. They also have a common yoke 112 at the bottom which has access holes (not shown) for maintenance with an inside diameter equal to the inside diameter of each reaction chamber respectively. The bottom access cover(s) may be a common part or may be separate. The pressure chambers plus covers contain the pressurized reaction products safely within the operating parameters. The two chambers are connected by plumbing near the top to enable vapors and reaction products to flow successively from one to the other and back again as described below.

A vacuum shroud 114 containing an insulating layer 116 (e.g., a fiberglass radiation blanket or equivalent) encloses the entire reactor body except where penetrations are provided for material flow ports and for sensors. A vacuum 115 is enabled by pumping gases through an evacuation port 117.

Adequate sealing of these areas sustains the integrity of both the vacuum 115 and the pressure vessels and should be as small as possible to minimize wasteful heat losses by conduction. An overpressure relief valve 118 is present to vent the contents of the reaction chambers in the event pressures exceed the intended operating maximum. Furthermore, as a normal safety measure, the vacuum shroud 114 may include an emergency overpressure burst membrane 120 in the event any of the many pressure chamber seals leak into the intended vacuum of the shroud cavity, creating an overpressure risk.

A mixture of hydrogen peroxide and water is pumped into the reactor 102, through an inlet 122 starting the reaction process. Exposed to catalysts in the wet vessel, the mixture decomposes into water and oxygen according to Eq. 1.

Any remaining mix water is evaporated with heat provided by a hot steam bath 124 from the dry reaction chamber circulating around the wet vessel. The resulting oxygen rich saturated steam 126 migrates from the top of the wet chamber 102 to the dry chamber 104 through a port 128. Upon entering the top 128 of the dry chamber 104 the vapors are mixed with injected fuel 130 that is provided by a fuel injector 132.

The mixture temperature is near the boiling point of water as it begins to descend through the dry reactor 104. The mixture passes through a heat exchanger and an auxiliary heater (both shown in more detail in FIG. 2) raising its temperature to about 218° C. to 232° C. (425° F. to 450° F.) before descending to the bottom 134 of the dry chamber 104 to the catalytic stack (shown in more detail in FIG. 2) where the oxygen/fuel mixture catalytically is combusted, producing super critical steam 136 (>394° C. or 705° F.).

The super critical steam 136 circulates upward between the pressure vessel walls and the exterior of the catalyst stack helping provide a uniform high temperature environment for the catalytic converter. It continues upward providing heat for the heat exchanger before returning to the wet reactor 102. The super critical steam 136 enters the wet reactor 102 through a port 137.

Inside the wet reactor the hot steam bath 124 circulates downward bathing the interior wet vessel to provide heat to complete the evaporation inside of any remaining liquid water. The slightly cooled hot steam 138 exits the wet reactor pressure vessel through a port 140 at the bottom to be ducted to the input port of an expansion engine (not shown).

The gases perform mechanical work as they are expanded in the expansion engine until discharged to the exhaust. The temperature of the steam exiting the expansion engine should be sufficient to maintain the vapor in the gas state throughout the expansion process. This condition is managed by an electronic controller (described below). The fully expanded waste steam exiting the engine subsequently heats the exterior of the engine and reactor assembly by appropriate ducting through a system enclosure before being discharged to the ambient air (as discussed below).

It should be noted that neither the hydrogen peroxide nor the fuel is preheated before insertion into the wet reactor 102. This is intended to prevent the premature decomposition of the hydrogen peroxide or vapor bubbles in the fuel line. In some system implementations it may be desirable to preheat the fuel slightly with waste heat from the engine exhaust. This exception should be managed carefully to prevent the fuel from vaporizing before being injected into the reactor.

Wet Chamber

Figure 2A:
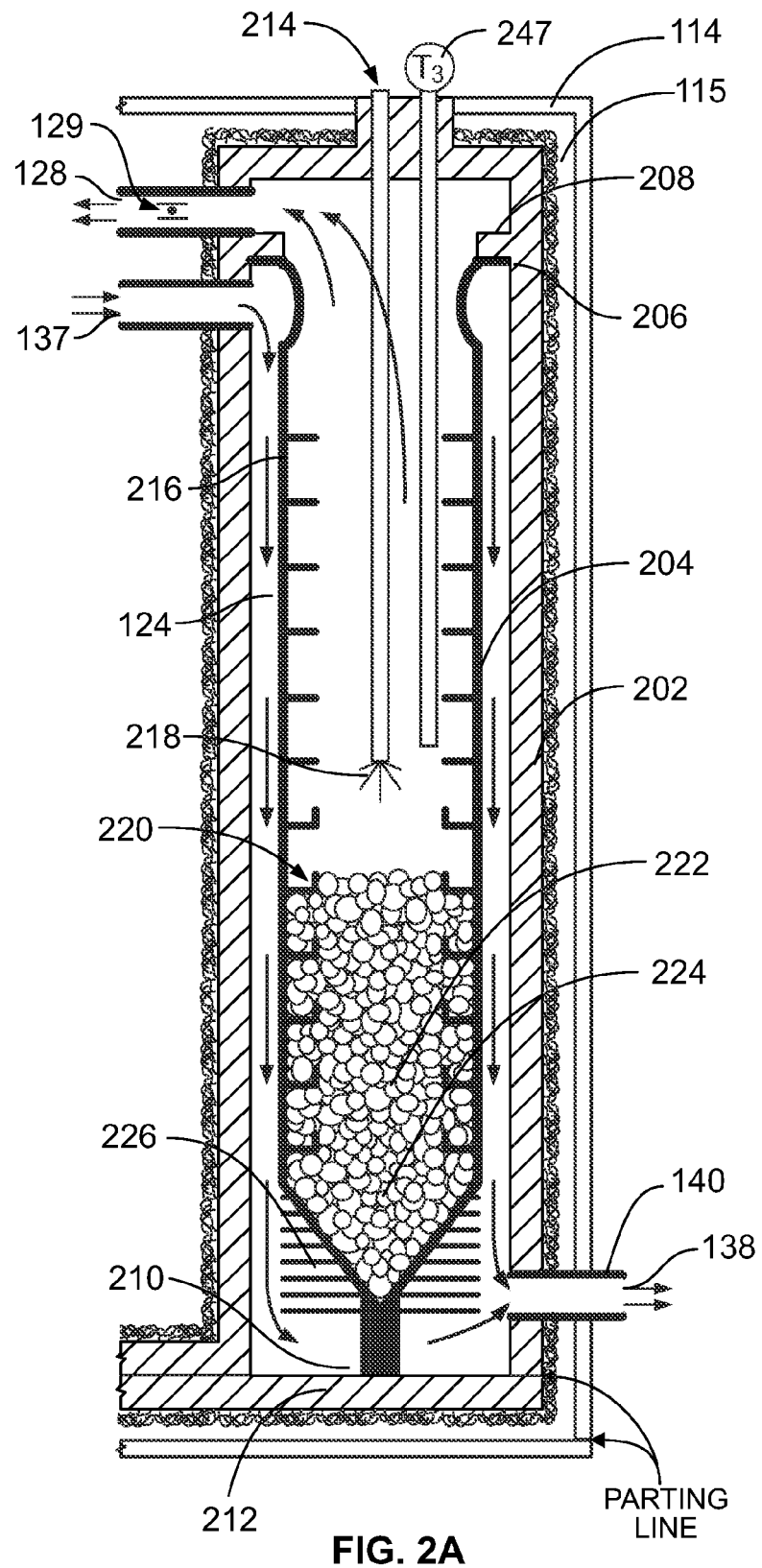
FIG. 2A illustrates a first chamber including a reactor for decomposing hydrogen peroxide to generate oxygen, according to an embodiment.

FIG. 2A illustrates the wet chamber 102 in greater detail. The wet chamber comprises two shells, one nested inside the other. The outer shell comprises the pressure vessel wall 202 and the inner shell 204 contains the reacting hydrogen peroxide and water mixture. The two shells, 202 and 204, are isolated from each other with respect to mass flow, but the inner shell 204 is as thin as practical to enable ample heat flow from the outside to the liquid and vapor contents inside. There is no direct connection between the two shells 202 and 204, but there is an indirect connection through the rest of the system. Consequently the pressure gradient across the interior vessel walls should be small.

Isolation is achieved by a compression seal 206 between the top of the inner vessel and a shoulder surface 208 in the outer shell 202. The seal only has to withstand the pressure head difference between the input and the output of the reactor. The seal compression force is provided through the body of the inner vessel from a foot 210 at the bottom of the vessel that is compressed and spatially registered by an appropriate feature on the bottom access cover 212. Removal of the access cover 212 enables the inner vessel to be removed for maintenance.

The input mixture 214 of hydrogen peroxide and water is decomposed and evaporated within the inner shell 204. The mixture 214 is inserted into the middle of the reactor body providing substantial overhead volume to reduce the migration of aerosols into the dry reactor. Interior shelves 216 above an insertion point 218 serve to provide a surface for mist to collect for evaporation. They also behave as heat fins to help vaporize any aerosols that do migrate into that region.

Below the insertion point 218 the shelves have added edges to make them behave as trays 220 to hold liquid sprayed in or running down the wall surfaces. Holding the liquid on the wall trays 220 improves the heat transfer from the vessel walls to the liquid for evaporation.

The wet chamber distills these liquids, preventing contamination downstream with impurities contained in the input mixture. By confining liquid water and liquid hydrogen peroxide to the wet chamber, the more expensive catalysts in the dry chamber are protected from exposure to corrosive liquids that in the liquid phase have the capacity to dissolve and carry away the catalyst materials. Thus these elements are protected from the destructive effects of both catalyst poisoning and ablation.

Marble sized manganese dioxide lumps 222 may be used as the principal catalyst (by volume) in the wet reaction chamber 202. The lumps 222 provide an adequate surface area to initiate decomposition of the hydrogen peroxide. Large lumps are preferred in lieu of smaller particles with greater surface area both because gas flow is better through the bulk lumps and it is desirable to slow the initial decomposition somewhat when the fresh hydrogen peroxide solution is strongest. Evaporation is not instantaneous. Instead, whilst still decomposing, weakened peroxide/water mixture percolates through the lumps of manganese dioxide 222 to the bottom of the wet chamber.

By design there is insufficient energy in the hydrogen peroxide solution by itself to vaporize all its mix water without additional energy. Maintaining the operating temperature close to the boiling point of water provides a mechanism to facilitate gentle decomposition of the weak hydrogen peroxide. This constitutes a major benefit over other propulsion applications that used more concentrated hydrogen peroxide that is prone to violent decomposition.

Hydrogen peroxide variously boils at higher temperatures than water, depending upon the concentration, for example: $\Delta T_{20\%} = +3°$ C., $\Delta T_{31\%} = +7°$ C., and $\Delta T_{35\%} = +8°$ C., where the concentration is computed by weight. This difference means that as steam heats the wet vessel, water preferentially evaporates, tending to concentrate the weakened hydrogen peroxide that percolates through the manganese dioxide lumps. A small amount (1-2 g) of potassium permanganate 224 (a more effective catalyst) may be added to the bottom of the wet vessel to accelerate decomposition of the remaining hydrogen peroxide.

It is preferred for the hydrogen peroxide to have a concentration of 62% or less by weight, because at concentrations of about 62% or less, at standard temperatures and pressure (e.g., 1 atmosphere), there is enough energy released by the reaction to produce enough heat to evaporate residual water in the wet vessel. It is also preferred for the hydrogen peroxide to have a concentration of greater than about 15% by weight, because at concentrations in a range of about 20% or 15% or less, depending upon operating conditions at standard temperatures and pressure, there may not be enough energy released by the reaction to produce enough heat to fully evaporate residual water in the wet vessel. Therefore, in various embodiments, hydrogen peroxide of concentrations by weight at or greater than a lower concentration range limit of about 15%, 18%, or 20% can be used. Also, in various embodiments, hydrogen peroxide of concentrations by weight at or less than an upper concentration range limit of about 62%, 50%, or 35% can be used. In various embodiments, hydrogen peroxide concentrations may be specified to be within a range between any of the aforementioned upper and lower concentration range limits, or values therebetween. For example, hydrogen peroxide concentrations of about 35% by weight may be particularly useful.

The intention of this design is to enable the remaining hydrogen peroxide to be decomposed more completely without the overly vigorous reaction expected if the potassium permanganate were used alone. The depleted hydrogen peroxide reaching the potassium permanganate will bubble less causing less migration by splashing and by aerosols of the potassium permanganate solution upward within the wet reaction vessel. It should be noted that the injection nozzle 218 placement preferably is selected to provide a mechanism to flush the potassium permanganate off the surfaces of the manganese dioxide lumps and the vessel walls and back to the bottom of the wet reaction vessel.

The maximum rate that water can be evaporated from the wet chamber provides an upper limit of the amount of water that can be used in the hydrogen peroxide mixture for a given mass flow rate.

Annular heat vanes 226 may be provided at the bottom of the wet vessel to facilitate heat transfer from the circulating steam coming from the dry reactor 104.

Dry Reactor

Figure 2B:
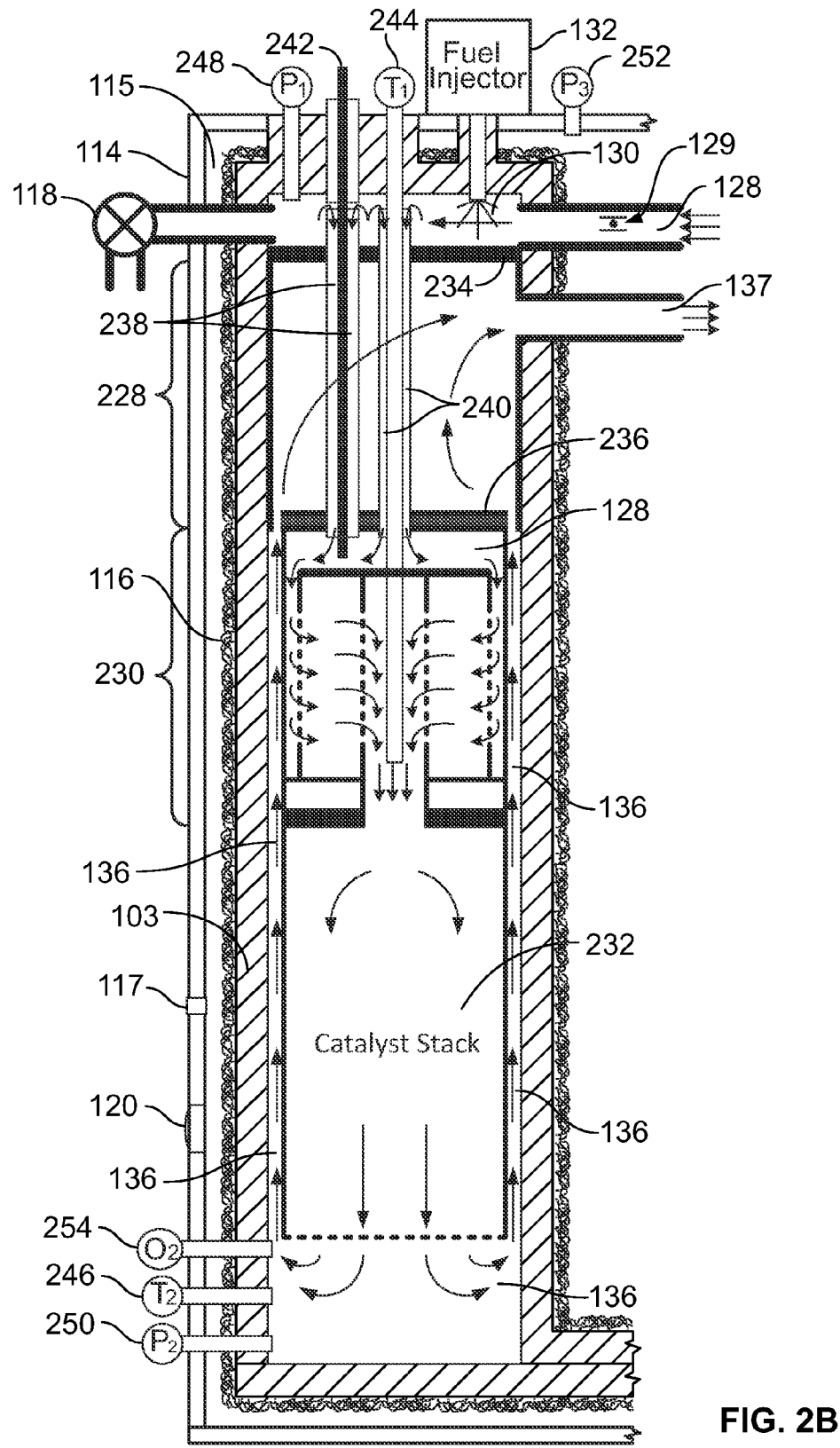
FIG. 2B illustrates a second chamber including a reactor for catalytically combusting a fuel/oxygen/water mixture to generate reaction products having elevated temperature and pressure, according to an embodiment.

FIG. 2B illustrates the dry reactor 104 in greater detail. The dry reactor comprises three modules. The first, located at the top of the dry reactor, is a heat exchanger module 228 designed to preheat the incoming fuel and oxygen mixture to the light off temperature for the catalyst stack in the bottom of the dry reactor. The heat exchanger will not preheat the mixture adequately until the catalyst stack itself followed later by the remainder of the dry reactor components reach a steady state operating temperature.

The second module is an auxiliary heater 230 that is designed to supplement the heating from the heat exchanger until full operating temperature is achieved. The third module is the catalytic stack 232 downstream from the heat exchanger 228 and heater modules 230. Catalytic enabled combustion occurs in this section liberating heat from the reaction of the fuel and oxygen. Super critical steam 136 emerges from the catalytic converter with temperatures exceeding 400° C. (752° F.). It circulates upward outside the catalytic converter providing a uniform high temperature environment for the converter.

Heat Exchanger

The purpose of the heat exchanger 228 is to preheat the vapors 128 entering the catalytic converter 232 using surplus heat emerging from the catalytic converter. It comprises two concentric disks, 234 and 236, the top and the bottom connected by penetrating vias (alternatively, apertures or tubes) 238 and 240 brazed to provide both structural integrity and a pressure seal. The vias 238 and 240 conduct the incoming fuel/oxygen mixture from the top through the heat exchanger and into the heater module below.

Three of these vias are much larger and serve dual purposes. Two vias 238 house the heater bus bars 242. These bus bars 242 are electrical poles for the heater which are positioned to provide adequate clearances from the surrounding metallic vias 238. The third 240 is concentric with the reactor axis and surrounds the T1 temperature sensor well 244. Multiple smaller vias (not shown) are distributed liberally around the remaining disk surfaces. Generally the design should not impede the flow of reaction products out of the dry vessel. The top of the heat exchanger 228 is sealed against a shoulder in the pressure vessel.

Further sensors are illustrated for temperature: 246 (T2) and 247 (T3), pressure: 248 (P1), 250 (P2), and 252 (P3), and oxygen concentration 254.

Figure 3A:
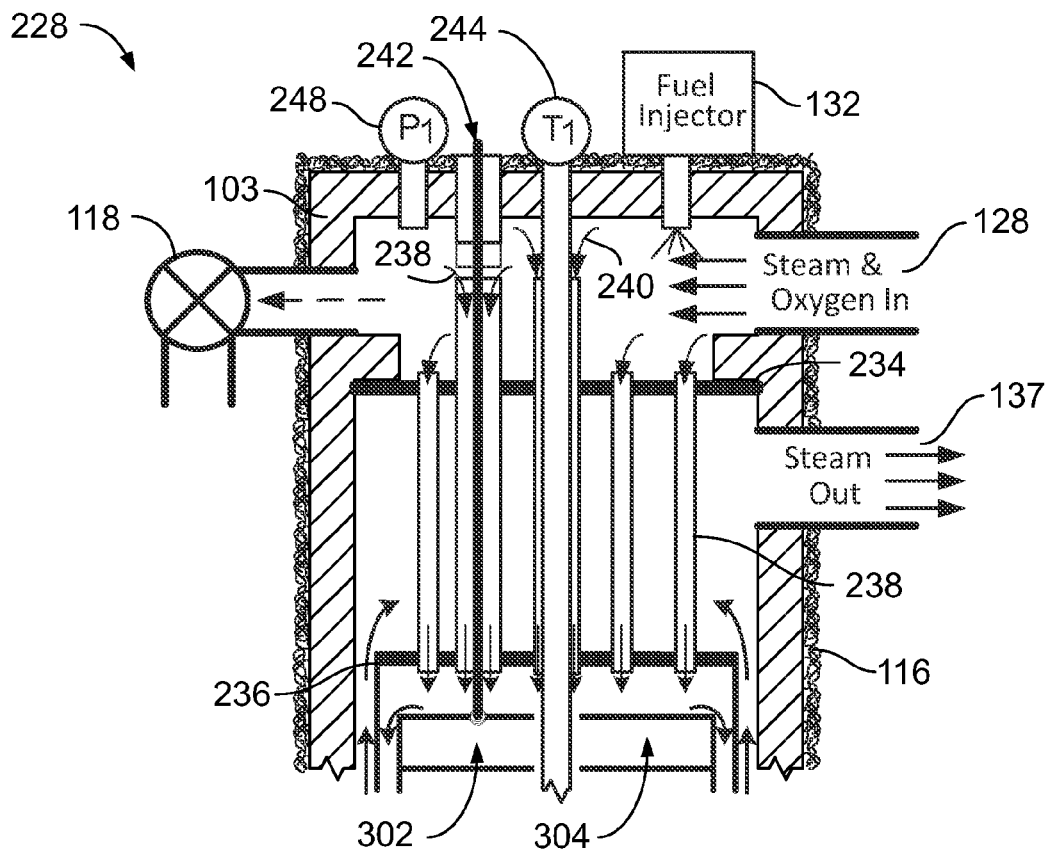
FIG. 3A is an expanded cross sectional view of a heat exchanger of the second chamber of FIG. 2B, according to an embodiment.
Figure 3B:
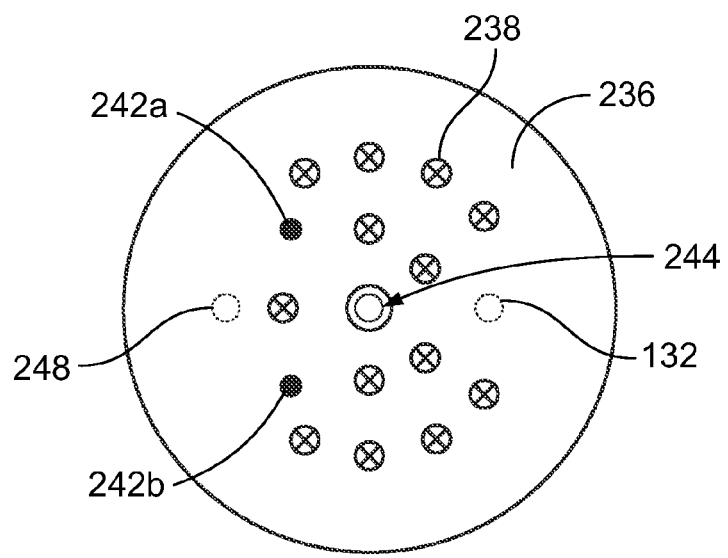
FIG. 3B illustrates a top down view of the top disk of the heat exchanger of FIG. 3A, according to an embodiment.

The heat exchanger 228 is illustrated in greater detail in FIGS. 3A and 3B. FIG. 3A is an expanded cross sectional view of the heat exchanger 228 of FIG. 2B. In particular, the collection of vias 238 and 240 are illustrated in further detail. Also illustrated in FIG. 3A is an electrical connection 302 between the heater bus bar 242 and a heater backplate 304 of the heater module 230 to be discussed in greater detail below.

FIG. 3B illustrates a top down view of the top disk 236 of the heat exchanger. FIG. 3B illustrates the arrangement of several of the vias 238 as well as two of the heater busses 242*a* and 242*b* and the T1 sensor 244. The relative location of the P1 sensor 248 and the fuel injector 132 (located above the disk 236 as shown in FIG. 3A) are also shown.

Heater Module

The purpose of the heater module 230 is to provide sufficient heat to enable self-sustained combustion to occur within the catalyst module 232 below and downstream of the heater module. Until the heat exchanger 228 is at full operating temperature the heater module 230 needs to provide sufficient supplemental heat to raise the temperature of the combustible mix to the light off temperature of the catalyst stack below.

Heater Module Construction

The heater module 230 is attached to the bottom of the heat exchanger 228. Its angular registration about the reactor axis provides adequate clearances between the heater electrical bus and the surrounding metallic heat exchanger vias.

Heater Lamps

Figure 4A:
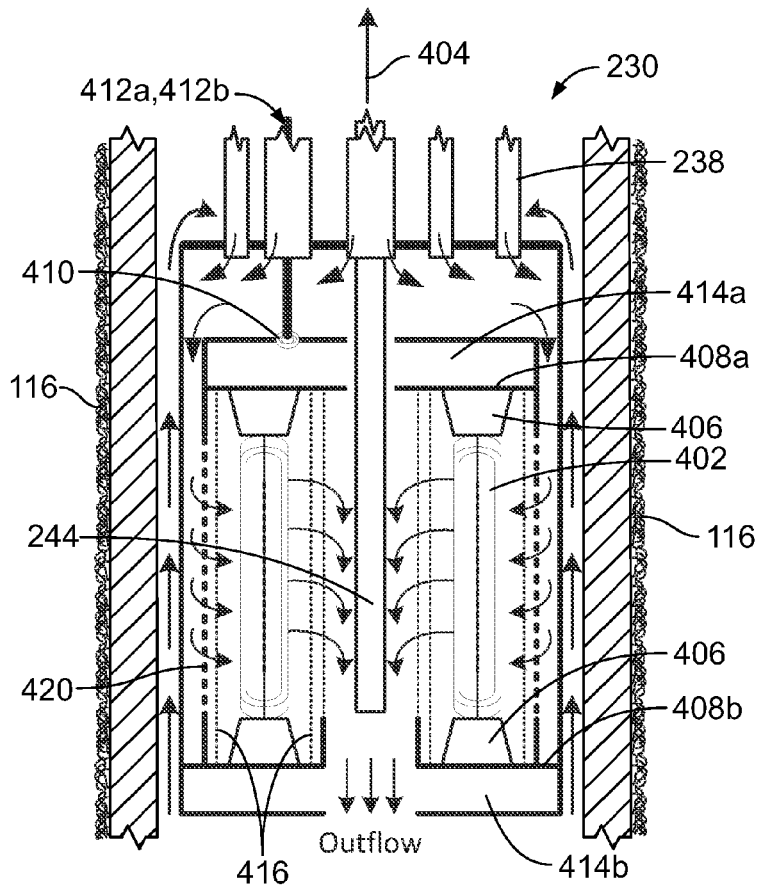
FIG. 4A illustrates a cross sectional view of the heater module of FIG. 2B, according to an embodiment.
Figure 4B:
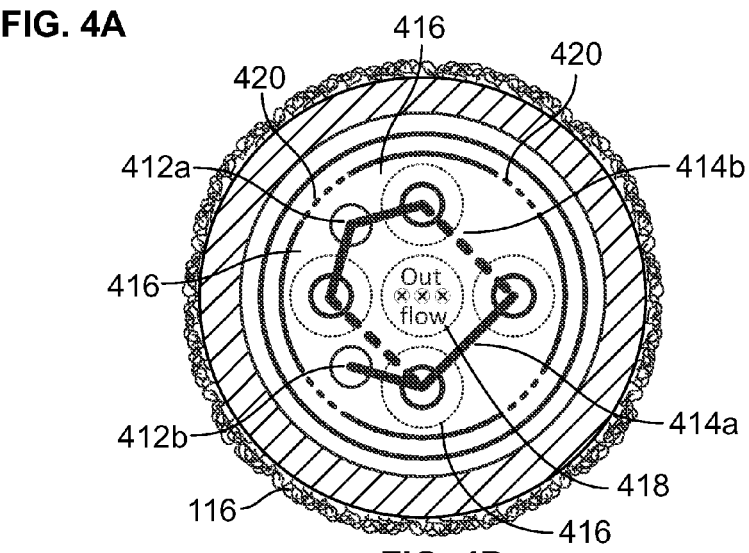
FIG. 4B illustrates a top down view of the heater module of FIG. 2B, according to an embodiment.

FIGS. 4A and 4B illustrate the heater module 230 in greater detail. FIG. 4A illustrates a cross sectional view of the heater module while FIG. 4B illustrates a top down view.

The heater interior comprises a parallel array of quartz-halogen lamps 402 equally spaced around and equidistant from the reactor axis 404. This embodiment contains four lamps. Each lamp is held in place using two porcelain R7s lamp bases (or equivalent structures) at each end attached to respective structural backplanes 408*a* and 408*b*. The top backplane 408*a* is powered by a rigid conductor electrical bus 410 comprising two poles 412*a* and 412*b*.

Bus 412*a* is attached to two lamp bases and bus 412*b* is attached to the other two lamps. Each of the two lamps connected to 412*a* is connected to just one of the 412*b* lamps through an interconnect 414 between the respective bases. The top interconnect 414*a* is on the inflow side of the heater module and the bottom interconnect 414*b* is on the outflow side. The interconnects 414*a* and 414*b* are illustrated in FIG. 4B as solid and dashed lines respectively.

Thus the four lamps are wired as a pair in parallel of two lamps in series. Since the series resistance doubles the lamp resistance alone, the series configuration operates at twice the lamp rated voltage when driven at full power. Actual lamp power rating is at the designer's discretion, although in the interest of generating a symmetrical heat distribution preferably the lamps are chosen to each have the same power output.

Heater Lamp Mantles

Around each lamp is a silver plated wire mesh cylinder that behaves as a catalytic combustion mantle 416 when heated by the proximity of the radiating lamps within. There also is an isolated mantle 418 surrounding the virtual central exit cylinder (corresponds to the output port projected along the axis 404 through the volume of the heater module). This lone central mantle 418 is heated by the radiation emanating from the surrounding lamps.

This embodiment confines the locus of combustion sufficiently near the heat source (lamps) to prevent detonation starting at the lamp surface whilst enabling reactant heating with the lamps on. When the lamps are turned off, the preponderance of high velocity colder vapors streaming past the mantles quickly cools the mantles below the combustion temperature, quenching heater module combustion.

Also illustrated in FIGS. 4A and 4B are perforated wall input structures 420 that allow the oxygen/fuel/water mixture to flow downward (parallel to the axis) and inward (radially) as it flows through the heater module past the heater lamps.

Heater Vent-Hole Arrays

The perforated wall input structures 420 are illustrated in further detail in FIGS. 5A and 5B. Each such structure has an array of vent-holes 500. FIG. 5A illustrates a cross sectional view of an embodiment vent hole array 500 and FIG. 5B illustrates a facing view (i.e., as viewed along the radial direction).

There are as many vent-hole arrays as there are heating lamps. The arrays 500 are positioned between lamp pairs so the mix flow path is directed symmetrically between the lamps (as illustrated by feature 420 in FIGS. 4A and 4B). Each array 500 comprises three vertical rows of holes of progressively sized holes. The smallest holes 502 are at the top and the largest holes 504 are at the bottom. They are equally spaced, center to center in this example. The largest holes have twice the area of the smallest holes (diameters related by factor of square root of two). This is because relative flow impedance of the narrow passage between the pressure vessel wall and the heater wall ranging between the first and the last vent-hole positions in this example differs by a factor of two in this example. Vent-hole size compensation balances the top and bottom flow rates so that it is generally equal over the length of the lamps.

The sum of the areas of the array holes combined is about 1.5 times the cross sectional area of the interior plumbing connecting the reactor vessels. This is judged to be sufficient to enable adequate mix flow without excessive backpressure. The vent-hole centers for adjacent vertical rows of holes are offset so neighboring vent-hole centers form an equilateral triangle. As a result, any angular momentum systematically imparted to mix flowing through any hole is canceled somewhat by the similar angular momentum of adjacent flows, smoothing the flow emanating collectively from the array so that it is more laminar.

Heater Flow

The flow through the heater module begins at the top of the module which interfaces with of the exhaust end of the heat exchanger module. The combustible mixture (referred to hereinafter as "mix") moves to the outside periphery and downward between the inside components and the outside walls of the heater module. This geometry enables additional heat exchange with the upward flowing combustion products flowing outside the heater wall. This arrangement becomes important when the reactor is at full operating temperature and the lamps are turned off. Vertical linear hole arrays (e.g., as shown in FIGS. 5A and 5B) in the inside wall enable the mix to penetrate the heating chamber of the heater module.

Inside the inner chamber, the mix flows past the heater lamps and through the surrounding lamp mantles. Flowing through the isolated center mantle the material moves downward through the heater interior and out the center hole in the bottom.

Heater Operation

The heater should reach its light off temperature (hot enough to support combustion as measured by sensor 244 (T1)) before vapor flow begins. Otherwise the catalysts will be cooled by the vapor flow. Also, if intense enough, premature vapor flow can prevent the heater ever from attaining the light off temperature. Cooling rates should not exceed the combined heating rates from the lamps plus nascent combustion on the mantles.

Stability of Heater Combustion

Before the lamps are turned on, temperatures will be insufficient to support combustion on the mantle surfaces. However, any residual hydrogen peroxide vapor has a high probability of decomposing upon contact with the mantle material. When the lamps are on and portions of the mantles exceed the light off temperature, these surfaces will support catalyzed combustion. Combustion spreads on the mantle surfaces as they warm. Where the cooling effect of the incoming vapor stream exceeds the combined effects of the radiating lamps and nearby combustion, the locus of combustion will stabilize. Thereafter it will expand more gradually as the temperature of the incoming vapor increases.

While combusting, the mantles are the locus of the hottest temperatures outside the lamp filaments themselves. This constrains combustion to this region. The region outside the mantles is too cool to combust because of the mass inflow. The region inside the mantles is too chemically depleted by the surrounding combustion therein to combust.

The mantles effectively create a cocoon around the lamps wherein the partial pressure of the reactants in the cocoon is less than outside the mantle because the reactants are consumed by combustion as they diffuse through the mantles. The lower partial pressure (lower concentration) means the chemical potential of the reactants is less inside the mantles. The chemical potential (and the reactivity) increases closer to the mantle both because of diffusion of fresh reactants from the outside increasing reactant concentration and because of higher temperature. In the presence of a convenient catalytic site on the mantle, the high chemical potential mix combusts, drops to a lower chemical potential and emits heat. The incoming mass flow flushes combustion products from the mantles and introduces fresh mix to perpetuate the combustion cycle on the surface of the mantles.

Turning the lamps off after combustion has been established, eventually will extinguish any mantle combustion already in process because of the cooling effect of the vapor stream will exceed the nominal heating from combustion on the mantle.

Thermal Profile

While the lamps are radiating heat and combustion is the norm on the mantle surfaces, the temperature gradient will increase to a maximum approaching the mantles from either side. Regardless of heating from both the lamps and the mantles, lower temperatures outside the mantles are sustained by the inflow of the relatively cooler mix input streaming past the mantles, migrating toward the center of the reactor.

Center Mantle

Being more remote, the lone center mantle 418 (FIG. 4B) will support combustion sometime after the lamp mantles all are supporting combustion and radiating heat. In the centralized location the amount of the mantle passively exposed to radiant heating from its surroundings eventually is enough to heat the center mantle to combustion temperature. The somewhat warmed vapor stream traversing the center mantle will cool the center mantle less than the similar cooling of the other lamp mantles because the mass flow is hotter. These relations enable the center mantle to combust more vigorously once combustion is established. Center mantle combustion results in the vapors descending into the catalyst module below being sufficiently hot to support catalyzed combustion. Once inside this virtual column, there is little opportunity for the heated vapor to cool before reaching the catalyst module because of the large amount of combustion surrounding it within the heater module.

Catalyst Stack

Figure 6:
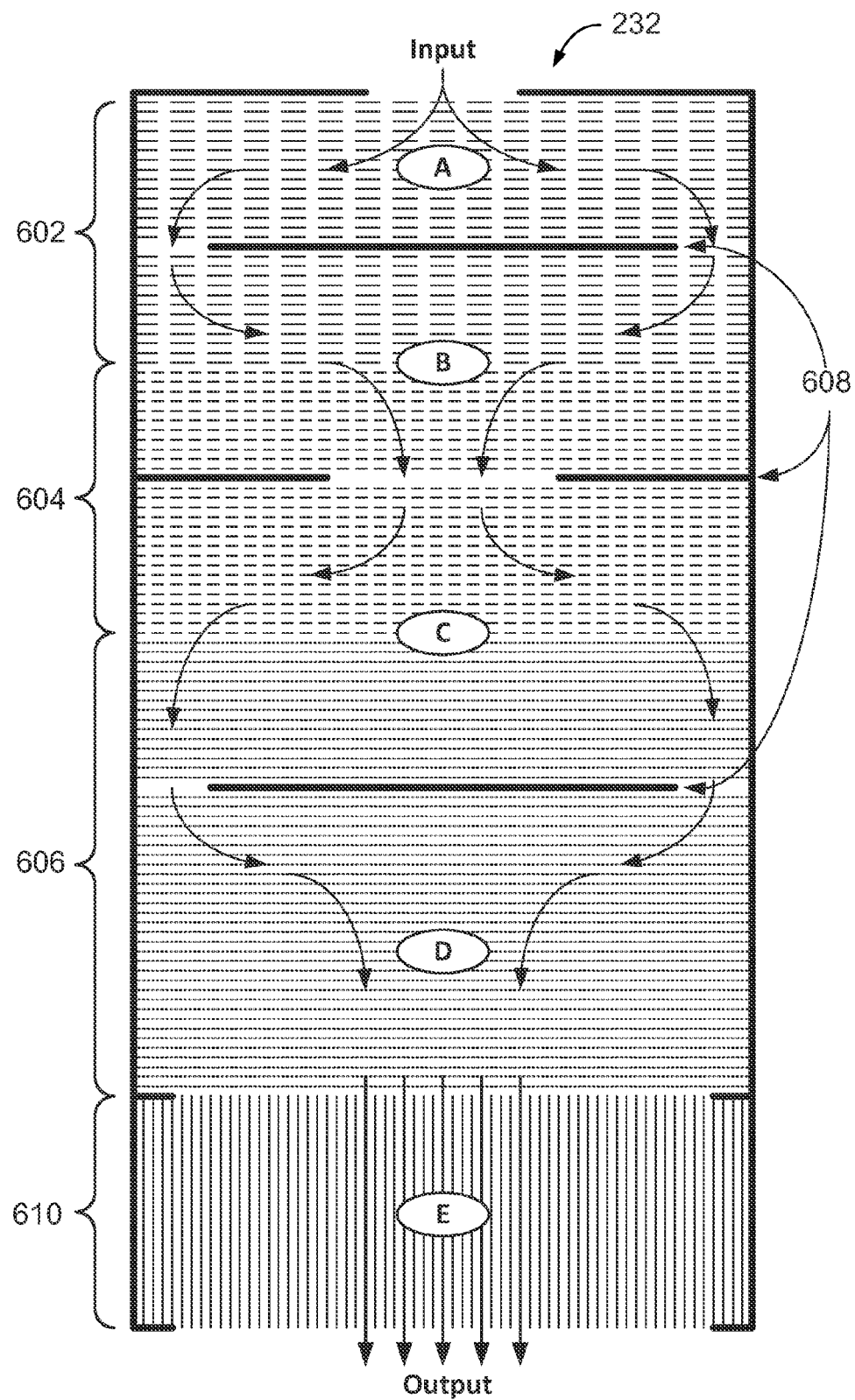
FIG. 6 illustrates an example of the catalyst stack module of FIG. 2B, according to an embodiment.

FIG. 6 illustrates an example catalyst stack module 232 in greater detail. The catalyst module resides immediately downstream of the heater module 230. It is a stack of several types and grades of stratified catalytic materials organized into zones.

The first four zones A, B, C, and D comprise an appropriate metal catalyst coated wire mesh progressing downstream from course 602 to medium 604 to fine 606 pitch. Examples of appropriate catalysts include silver coated wire or equivalent on the mantles and in the first part (zones A-D) of the catalyst stack. The variation in mesh density helps distribute the locus of combustion thereby making the temperature distribution more uniform. Because the incoming combustible mixture is the strongest at the inlet, course mesh 602 is used. It presents less surface area and fewer catalytic sites, thereby limiting the reaction and preventing overheating in this zone. An ancillary benefit of using the course mesh 602 first is to help protect the downstream finer mesh from the occluding effects of debris or other contamination that may accumulate within the system.

The input stream is concentrated about the axis (zone A) so the light off temperature is reached more quickly when the heater is operating. After combustion starts here, heat is propagated throughout the width of the catalyst by the influence of the first steering baffle in the center. Both heating and combustion cascade downstream from this region, propagating combustion throughout the catalyst volume.

Steering baffles 608 may be provided throughout the catalyst stack to homogenize the temperatures and to use all the catalytic material. The catalyst stack should operate within an acceptable temperature range, sufficiently hot to promote catalyzed combustion, but not so hot as to vaporize the catalyst material.

Initially, substantial heat is lost from the catalyst volume to the reactor walls during the warm up phase. After the walls reach a steady state temperature internal heating is sufficient to maintain the minimum temperature of ongoing catalyzed combustion without the supplemental heating from the heater module.

At the steady state wall temperature hot mass flow from combustion occurring near the walls moves under the influence of the second steering baffle toward the center (zone B), behind the first steering baffle 608. Resultant heating of the metal baffle will conduct some heat to the input side of the baffle (zone A), heating the incoming vapors that will be cooler after the heater module is turned off.

This embodiment is designed so as to maintain a minimum amount of catalyzed combustion near the entrance to the catalyst stack. Without such a minimum there is a potential that the hot zone will move downstream. Under these circumstances the locus of initiation of combustion will continue to move downstream, progressively cooling the catalyst stack until there is insufficient heat for the combustion to go to completion. Recovery would be achieved by reintroducing of heat through the heater module. The bottom of the catalytic module includes a region (zone E) containing a catalytic material that acts as a soot filter 610. The soot filter 610 may comprise platinum, palladium, rhodium or equivalent supported by alumina (aluminum oxide ($Al_2O_3$)), ceria (cerium oxide ($Ce_2O_3$)), carbon nanotubes, or equivalent substrates.

Vacuum Shroud

As discussed earlier, the entire system preferably is surrounded by a vacuum shroud that boosts efficiency by conserving the heat produced by the chemical reactions inside. A Dewar fashioned vacuum envelope 114 (see FIG. 1) enclosing the entire reactor prevents high temperatures from driving heat loss through the walls of the system. The vacuum 115 (FIG. 1) prevents conduction loses except where penetrations dictate: around mass flow plumbing, around sensors, and minimal structural supports. An insulating blanket such as fiberglass covering interior surfaces of the evacuated cavity reduces radiation losses from the hot interior surface to the exterior.

The vacuum is enabled through an evacuation port 117 (FIG. 1) upon sealing the bottom access cover. Because this seal among others is vulnerable to leaking even under normal use, a system vacuum pump replenishes the vacuum as required. Subsequent maintenance evacuation is controlled by an electronic control unit using sensor input (sensor P3, 252 in FIG. 2B).

Fuel Injection Subsystem

The fuel should be pressurized significantly greater than the maximum operation pressure to flow into the reaction chamber. This pressure should exceed the combined pressure of the reactor plus the pressure head associated with the maximum mass flow rate traversing the fuel injector device itself. The fuel bypass path downstream of the fuel injection feed junction should be adequate to prevent waste heat from the reactor from vaporizing fuel in the fuel line regardless of the on/off state. Fuel vapor bubbles in the fuel line can impede the proper operation of the fuel injector device.

The fuel injector should enable high speed activation and high frequency cycling for precise dispensing of low volume fuel flow.

Fuel Injector

Because the fuel consumption for this device is small relative to the fuel consumption of a comparable internal combustion engine, the duration that the fuel injector is open is short. Short open durations are facilitated by fast response time opening and closing fuel injector valves to accurately meter fuel consumption into the reactor. Modern solid state injector designs may meet the response time and control specifications.

Pressurized Fuel Accumulator

The pressurized fuel accumulator has the same function as the pressure accumulator associated with the fuel rail on modern automobile electronic fuel injection systems. Its behavior is similar to a capacitor in an RC electrical circuit. It serves to smooth pressure fluctuations associated both with pumping action and the intermittent opening and closing of the electronic injection valve. The operation of the pressurized fuel accumulator causes there to be a sufficient supply of high pressure fluid to enable an undiminished flow rate through the open injector valve.

Fuel Pump

The fuel pump should be able to pressurize the fuel supply line sufficiently to overcome the combined dynamic impedance associated with flow through a small aperture fuel injector nozzle and valve system plus the operating pressure of the reactor interior.

Hydrogen Peroxide Insertion Subsystem

Figure 7:
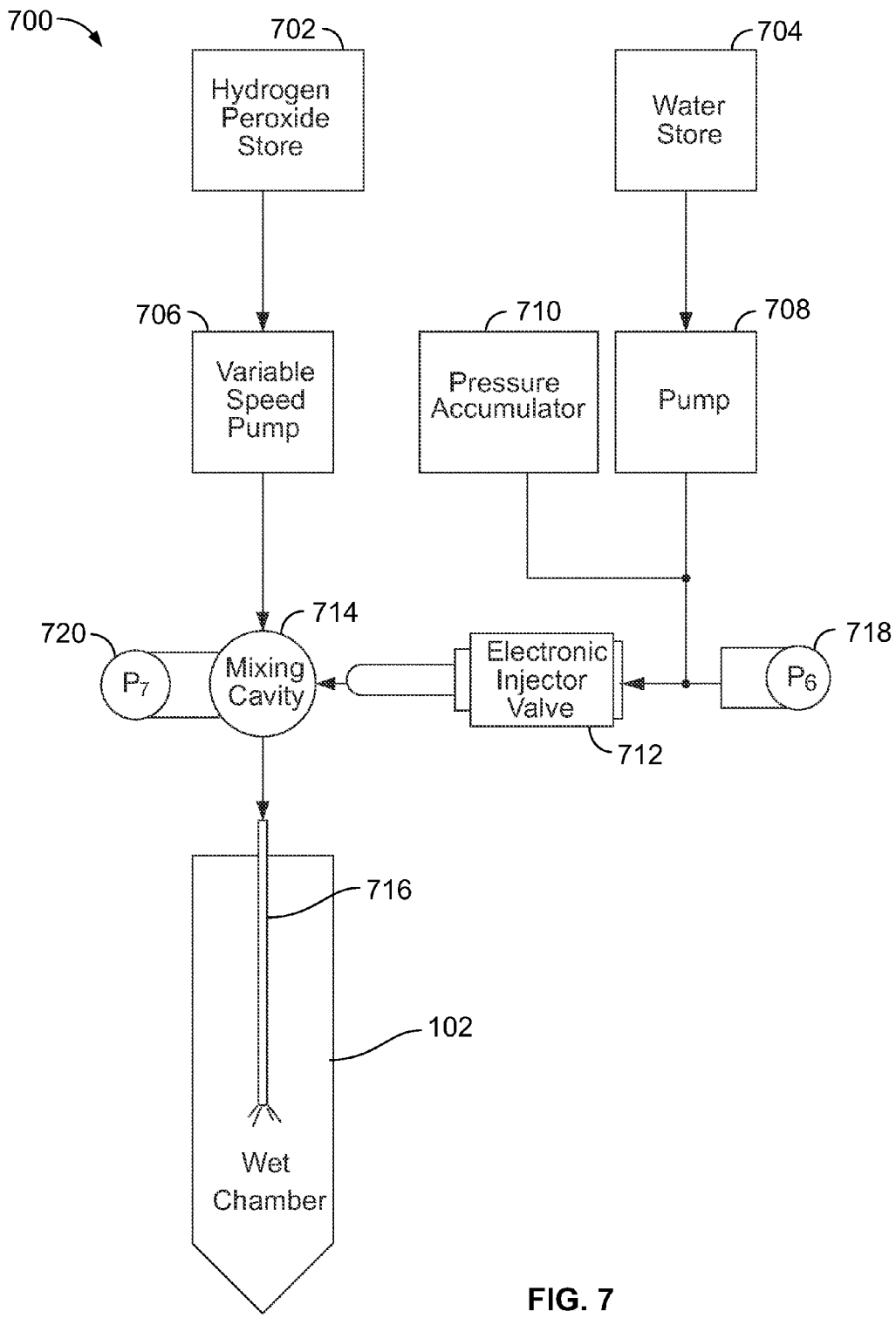
FIG. 7 illustrates the hydrogen peroxide pressurization and insertion subsystem, according to an embodiment.

The hydrogen peroxide pressurization and insertion subsystem is described with respect to FIG. 7. This system is the principal controller of the mass flow rate through the reactor system. It comprises storage tanks for consumables 702 and 704, pressurization pumps 706 and 708, a pressure accumulator 710, electric injector valve 712, a mixing cavity 714, an insertion probe 716, pressure sensors 718 (P6) and 720 (P7) and high pressure interconnecting plumbing.

Pressurization by pumping commits the hydrogen peroxide to the reactor interior immediately downstream of the pump. Thus the distance between the pump and the injector nozzle should be as short as possible to minimize premature decomposition and to improve control response time.

Water inflow is used to regulate system temperature. As the system gets hotter, the mass flow from the hydrogen peroxide source 702 is supplemented with water 704 intermittently injected to increase the time averaged water consumption which lowers the system temperature.

The insertion plumbing path comprises a probe 716 that serves to deliver the mix to the center of the wet reactor 102 connected to a mixing cavity 714 attached to the exterior of the reactor cavity. A fuel injector-like valve 712 is attached to the mixing cavity to inject dilution water into the mixing cavity. Its supply side is plumbed in parallel with a pressurized water storage cavity and high pressure pump. Undiluted hydrogen peroxide is pumped directly into the mixing chamber 714 where small quantities of water may be added to regulate system temperatures.

Mix Insertion Probe

The hydrogen peroxide insertion probe 716 should be long enough to penetrate into the center of the wet reactor chamber 102. This geometry was chosen to provide a mechanism to wash the walls and catalyst lumps of solvated catalyst, flushing the material to the bottom of the reactor. Being significantly recessed into the wet vessel also provides sufficient overhead to enable remaining aerosols to evaporate before being transported to the dry reactor vessel.

The probe 716 should withstand the corrosive effects of high temperature oxygenated steam and the corrosive effects of the hydrogen peroxide solution. Its interior should not contain any surface imperfections that will promote the decomposition of hydrogen peroxide. It should be polished and passivated to minimize the premature decomposition of the hydrogen peroxide in contact with its surfaces. Nitric acid passivation can be used.

Mix Dilution Cavity

The mix dilution cavity 714 serves as a physical junction between the hydrogen peroxide input stream pathway and the supplemental dilution water pathway. It should be made of corrosion resistant materials.

Water Injector

The water injector 712 behaves like a fuel injector on a modern automobile fuel injection system. Such a fuel injector will suffice in this role if it is compatible with the water operation. The water pump pressure should exceed the pressure of the mixing chamber (P6>P7) before allowing the water injection valve to open. The valve duty cycle (average open time/unit time) under electronic control provides the mechanism for controlling the average water consumption rate.

Pressurized Water Accumulator

The pressurized water accumulator 710 has a similar function to the pressure accumulator associated with the fuel rail on modern automobile electronic fuel injection systems. It serves to smooth pressure fluctuations associated both with pumping action and the intermittent opening and closing of the electronic injection valve. Operation of the pressurized water accumulator 710 causes there to be a sufficient supply of high pressure fluid to enable an undiminished flow rate through the open injector valve.

Water Pump

The water pump 708 pressurizes the water sufficiently to be injected into the pressurized system. The sufficient pressure exceeds the combined operating pressure of the reactor plus the dynamic impedance associated with driving the water through the electronic injector valve system and into the hydrogen peroxide mixing cavity 714.

Variable Speed Hydrogen Peroxide Pump

The hydrogen peroxide pump 706 pressurizes the liquid hydrogen peroxide against the opposing pressure of the reactor interior. Because it is the principal means to control the average mass flow through the reactor, the pump speed should be adjustable. It should be resistant to the corrosive effects of hydrogen peroxide and oxygen.

The function of the variable speed pump is to provide the correct mass flow of hydrogen peroxide over a wide pressure range (atmospheric to full operating pressure, >100 bar, depending on the implementation). Its maximum pressure and flow rate should be sufficient to maintain the desired mass flow rate for the reactor over the entire operating pressure range. When the reactor system is at full operating pressure, the pump pressure exceeds the reactor pressure sufficiently to enable the rated mass flow against the dynamic flow impedance into the reactor.

The pump preferably will not be an impeller type that will thrash the hydrogen peroxide liquid since percussive effect of an impeller promotes decomposition of hydrogen peroxide. The pump should not contain any closed cavities to encapsulate liquid hydrogen peroxide. Such cavities are vulnerable to overpressure conditions related to the decomposition of the hydrogen peroxide that can damage the pump chamber.

Operation

The super critical steam (T>374° C. (705° F.)) output from the catalyst stack within the dry reactor drives the heating of the rest of the dry reactor components. As these gases successively heat the walls of the pressure vessel and migrate upward through the heat exchanger, these features eventually will approach thermal equilibrium with the hot gases. Residual heat flow loss from the hot reaction products will equal the total heat lost from the vessel walls by radiation and through the few conductive paths associated with mass flow and sensor penetrations and structural connections. Quantification of this residual heat flow is a measure of the effectiveness of the system insulation.

The hot reaction products from the dry reactor, slightly cooled during its migration across the pressure vessel walls and through the heat exchanger, exit the dry reactor and enters the exterior shell of the wet reactor. There it bathes the wet vessel nested inside, heating its vapor and liquid contents. Sufficient heating evaporates the surplus water from the bottom of the wet vessel faster than water enters. Eventually water accumulated during cold startup evaporates entirely and the water inflow equals water evaporation.

Regulation

The system is regulated by controlling the temperatures at specific locations and the system pressure. The minimum input temperature of the dry catalyst which is measured by temperature probe T1, mostly depends on the bond strengths of the fuel used (425-460° F.). After combustion is established within the catalyst, temperatures can be increased by increasing the fuel up to the stoichiometric maximum determined by the $O_2$ sensor in the bottom of the dry reactor. Thereafter, temperatures can be increased by increasing the mass flow by increasing the hydrogen peroxide pump rate. Conversely, decreasing the mass flow rate or adding water to the mix will decrease the temperature. Excessive high temperature excursions can be ameliorated immediately by decreasing the operating pressure by venting though a bleeder valve. Since this wastes energy, this contingency should be used on an exception basis only and not as a standard operating procedure.

The maximum output temperature of the dry catalyst (as measured by temperature probe T2) is limited by the temperature tolerance of the catalyst materials themselves. The minimum heating of the wet chamber is determined by both temperature probe T3 and pressure probe P1, a boiling point criterion that varies with pressure. The complete evaporation of the accumulated water is the threshold that defines full operating temperature. The control circuitry detects this condition by the abrupt increase in steady state temperature of temperature probe T3, to a value slightly higher than the boiling point of water. Temperature probe T4 and ambient pressure probe P4 together determine if the exhaust is sufficiently hot to insure that the vapor remains in the gas phase (without condensation) as it exits the expansion engine.

Starting

Starting the system entails heating and pressurizing the system. The heater should be turned on and should exceed the minimum catalyzed combustion temperature, the so called "light off temperature", before vapor flow is initiated by pumping hydrogen peroxide into the wet chamber. Failure to do so drops the temperature in the heater module delaying or preventing it from reaching the light off temperature.

Once the heater is sufficiently above the light off temperature of the catalyst, hydrogen peroxide flow can begin followed thereafter by fuel injection which will start catalyzed combustion. As the system temperatures increase and as system pressure approaches half the full operating pressure, the flow through the catalyst can be gently increased by gradually opening the bleeder valve to limit the pressure to about 50% of the operating pressure. This should be slowly enough to prevent overly cooling the heater below the light off temperature as monitored by temperature probe T1, but fast enough that there is sufficient combustion in the catalyst stack to heat it. This narrow starting window can be widened by delaying mass flow until the heater is hotter. The catalyst will increase in temperature rapidly once combustion begins. Mass flow through the catalyst will spread heat throughout the catalyst followed by heating of the pressure vessel walls. The maximum tolerable rate at which the system can be brought to full operating temperature depends on the maximum tolerable heating rate for the pressure vessel walls. The goal is to prevent thermal shock that can compromise the structural integrity of the pressure vessel walls. This criterion should be controlled over a practical operating range by design regardless of initial starting temperatures.

When the system reaches full operating temperature, determined by the relatively complete evaporation of accumulated water during the startup phase, it is hot enough to withstand increased mass flow. At this point, the bleeder valve is closed as an engine valve is opened, whilst preventing the system pressure (at P2) and the catalyst input temperature (at T1) from both dropping during the transition.

After the system is online with its valve open, the operating pressure and the input hydrogen peroxide flow can be increased to their full operating levels.

Pressurization

Upon starting the engine valve, a main vent valve and a bleeder valve all should be closed to permit the system to be pressurized. Pressurization speeds heating by increasing the combustion rate and containing the evolved heat to raise the temperature of the reactor.

The input fluids are pressurized by pumps that pump against the pressure of the reaction chambers. System pressure increases as soon as the peroxide begins to decompose and more so when the fuel is combusted. The pumps operate at a slightly higher pressure than the operating pressure of the reactor. If the reactor pressure increases, the increased resistance decreases fuel flow. This effect assists mass flow regulation, preventing overpressure conditions. If reactor pressure exceeds the fuel pressure, fuel flow ceases. Check valves in the fuel lines prevent backflow from the reactor into the fuel pumps. If reactor pressure drops, fuel flow resumes.

Method of Power Generation

The systems described above generate reaction products having elevated temperature and pressure that can be used to generate power. The following discussion summarizes the method of generating power according to an embodiment.

Figure 8:
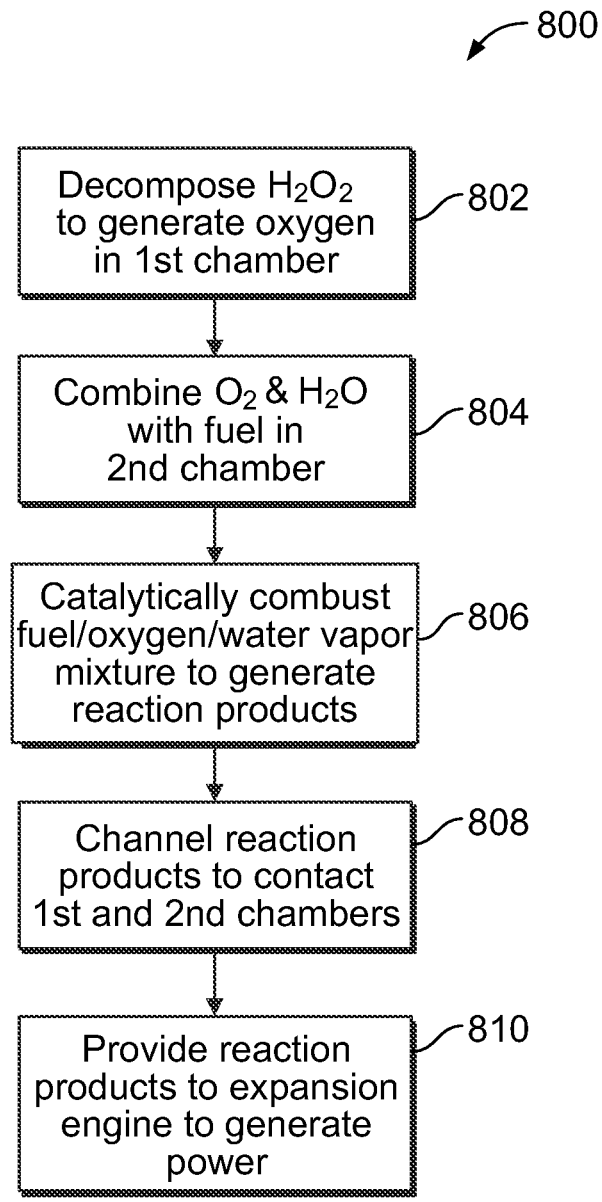
FIG. 8 is a flowchart illustrating a method of power generation, according to an embodiment.

FIG. 8 is a flowchart illustrating a method 800 of generating power according to disclosed embodiments. In a first step 802, the method includes decomposing hydrogen peroxide in a first chamber to generate oxygen and water. In the next step 804, the generated oxygen and water vapor is combined with a fuel in a second chamber to generate a fuel/oxygen/water mixture. In the next step 806, the mixture is catalytically combusted in the second chamber to generate reaction products having elevated temperature and pressure. Next at step 808, the generated reaction products are allowed to exit the second chamber and to come into contact with external surfaces of the first and second chambers to thereby transfer heat to the first and second chambers. Lastly at step 810, the generated reaction products are provided to an expansion engine to thereby generate mechanical power based on the elevated temperature and pressure of the reaction products. Carrying out this method 800 generates a sustained power supply, wherein the heat transferred to the first chamber acts to heat the hydrogen peroxide and vaporize the water, and heat transferred to the second chamber acts to heat the fuel/oxygen mixture.

Control

In an embodiment, a control system is provided. This system includes a number of sensors and an electronic control unit. In an example system, the following sensors are provided:

| Temperature: | |
|---|---|
| T1 | Exit of Heater Module |
| T2 | Exit of Catalyst Module |
| T3 | Wet Chamber Interior Near the Injection Site |
| T4 | Engine Exhaust |
| Pressure: | |
| P1 | Input of Dry Reactor |
| P2 | Output of Catalyst Module |
| P3 | Vacuum Cavity |
| P4 | Ambient Pressure |
| P5 | Fuel Injector Line Pressure |
| P6 | Water Injector Line Pressure |
| P7 | Mixing Cavity Pressure |
| Oxygen: | |
| $O_2$ | Oxygen Sensor |
| Mass Flow | |
| MFS | Mass Flow Sensor |
| Analog to Digital (A/D) Converters: | |
| $V\_AD_{cc}$ | Controller Voltage |
| $V\_AD_{Act}$ | Actuator Voltage |
| $V\_AD_{Heat}$ | Heater Voltage |
| Resistance | |
| $R_{Lamp}$ | Lamp Resistance |
| Miscellaneous | |
| WDT | Watch Dog Timer. This is comprises independent circuitry that will shut down the ECU if it is not refreshed by the ECU every 100 milliseconds. |
| On/Off | User interface normal On/Off switch |
| OFF_Now | User interface force off switch |
| Reset | User interface reset switch |

The system also includes a number of actuators. For example, an engine valve controls steam flow from the reactor exhaust to the engine using an actuator controlled variable flow valve. The actuator operates under power. It is plumbed parallel with a bleeder valve and a main vent valve.

The bleeder valve, which is another actuator controlled variable flow valve, controls steam flow from the reactor exhaust to outside via the exhaust shroud. The actuator operates under power. It is plumbed parallel with the engine valve and the main vent valve.

Like the bleeder valve, the main vent valve controls steam flow from the reactor exhaust to the outside via the exhaust shroud. It is an actuator controlled "push and hold" valve. Unlike the bleeder valve, it will return to a normally open state upon loss of power. This is a safety mechanism to facilitate the safe system shutdown in the event of power loss. It is plumbed parallel with both the engine valve and the bleeder valve.

A fuel injector has a function nearly identical to a fuel injector in a modern high pressure electronic fuel injection system. The main difference is that this fuel injector should be able to inject fuel against the pressurized reactor system. It also should be compatible with the corrosive environment of the high pressure oxygenated steam. Unlike other fuel injectors, it need not withstand the corrosive effects of high temperature combustion products and intermediates.

A water injector valve has a function similar to a fuel injector in a modern high pressure electronic fuel injection system. Such a fuel injector may be appropriate if it is compatible with water operation.

The hydrogen peroxide pump 706 (FIG. 7) utilizes a high torque variable speed motor and drive circuitry that is controllable by the electronic control unit. The motor and circuitry should be capable of continuous operation.

The water pump 708 (FIG. 7) behaves in similar fashion to a high pressure fuel pump for a modern high pressure electronic fuel injection system. It should be compatible with water operation.

The fuel pump has a function similar to a fuel pump in a modern high pressure electronic fuel injection system. Such a fuel pump is appropriate if it provides sufficient pressure for the fuel injector to operate against the pressurized interior of the reactor.

The vacuum pump is used to establish and maintain the vacuum within the vacuum shroud surrounding the chemical reactor. It will be used to "top off" the vacuum as it degrades resulting from minor seal leaks.

The heater module 230 (FIG. 2B) needs to be driven with sufficient electrical power at twice the rated voltage of the quartz halogen lamps used because they are wired in serial pairs.

An electronic control unit (ECU) controls all the operations of the reactor and expansion engine system, and includes circuitry to gather data from the various sensors and a processor to carry out various control algorithms to be described below. Embodiments of the ECU may comprise a processor, a memory for storing program data to be executed by the processor, a permanent storage such as a disk drive, etc. as will be described in greater detail below.

Computer Program Products for Process Control

In an embodiment, a non-transitory computer readable storage medium is provided having computer program instructions stored thereon that when executed by a processor, cause the processor to carry out various control processes of the ECU. These control processes are described more fully below.

The reactor comprises several components whose effects variously are delayed in time. Because conditions in any one place within the system affect changes elsewhere in the system later on, the system effectively possesses "memory". The relationships in space and time are simplified by the introduction a system "state" abstraction, represented by an arbitrary (n×1) state vector x. The simplification is that all of the "history" or "memory" effects of the system are comprehended by a single state vector synthesized by updates at discrete time intervals. The current state of the device can be expressed as a function of the last state plus control inputs plus noise. Thus the discrete model relating component differences at successive times is:

$$x_k = Ax_{k-1} + Bu_{k-1} + w_{k-1} \tag{3}$$

Where the subscripts indicate sample points at time k or k−1.

thus $x_k, x_{k-1}$ are the (n×1) state vectors at time k and k−1 respectively,

A is the (n×n) state transition matrix of equation coefficients, $u_{k-1}$ is the (s×1) control inputs vector at time k−1, B is the (n×s) control matrix of equations relating inputs to the other state variables, $w_{k-1}$ is (n×1) vector of unknown process noise from dynamic distributions $\sim N_{k-1}(0, Q_{k-1})$, $Q_{k-1}$ is the (n×n) process noise covariance matrix at time k−1.

The state transition matrix A comprises the coefficients that relate the various state variables in vector x. The equations in A are selected by the designer to represent n linearly independent equations. As such A will be positive-definite, non-singular and invertible.

A subset of the state variables is measureable and related to the vector of observations taken at time k:

$$z_k = Mx_k + v_k \tag{4}$$

where $z_k$ and $v_k$ are measurements and corresponding noise vectors respectively, M is the measurement sensitivity matrix which relates how the system states are related to the measurements. The following table describes the contents of the state vector x and equation coefficients in A.

Control Algorithm

Using the foregoing process model (Eq. 3 and Eq. 4) process control is manifested by a linear-quadratic-Gaussian (LQG) control algorithm comprising a linear-quadratic estimator (LQE) algorithm and linear-quadratic regulator (LQR). The LQE is a Kalman filter which estimates and updates the system state vector x.

Implementation of Computer Program Products

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

Also, using the disclosure herein, programmers of ordinary skill in the art to which the invention pertains may easily implement functional programs, codes, and code segments for making and using the invention.

CONCLUSION

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism," "element," "unit," "structure," "means," and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A system for generating reaction products having elevated temperature and pressure, comprising:
    a first chamber comprising:
        an inlet to receive hydrogen peroxide having a concentration between about 15% and about 62% by weight;
        a reactor to decompose the hydrogen peroxide having a concentration between about 15% and about 62% by weight, to generate oxygen and water vapor; and
        an outlet to allow the generated oxygen and water vapor to exit the first chamber;
    a second chamber comprising:
        a first inlet to receive the generated oxygen and water vapor from the first chamber;
        a second inlet to receive a fuel;
        a reactor to catalytically combust a mixture of the oxygen and fuel to generate reaction products having elevated temperature and pressure; and
        an outlet to allow the reaction products to exit the second chamber;
    a container having a wall, the first and second chambers are disposed within the container,
    a partition disposed within the container and between the first and second chambers, the container wall and the partition defining a passageway to receive reaction products exiting the second chamber and to channel the reaction products into contact with external surfaces of the first and second chambers; and
    an outlet to the container to allow the reaction products to exit the system.

2. The system of claim 1, further comprising:
    an expansion engine having an inlet to receive the reaction products from the passageway and to thereby generate power based on the received reaction products.

3. The system of claim 1, wherein the reactor in the first chamber contains:
    a catalyst, to facilitate the decomposition of the hydrogen peroxide, including at least two materials having differing catalytic reactivity.

4. The system of claim 1, wherein the reactor in the second chamber further comprises:
    a catalyst, to facilitate the combustion of the mixture of the oxygen and fuel, having a stratified structure including at least two materials having differing catalytic reactivity.

5. The system of claim 1, wherein the reactor in the second chamber further comprises:
    a catalyst, to facilitate the combustion of the mixture of the oxygen and fuel, having a structure comprising steering baffles to distribute the flow of combusting materials to facilitate generally uniform heating of the catalyst.

6. The system of claim 1, wherein the reactor in the second chamber further comprises an active heating module to pre-heat the mixture of the oxygen and fuel.

7. The system of claim 1, wherein the reactor in the second chamber further comprises a passive regenerative heat exchanger to pre-heat the mixture of the oxygen and fuel using heat transferred to the second chamber by reaction products moving through the passageway.

8. The system of claim 1, wherein the reactor in the first chamber further comprises a passive regenerative heat exchanger to pre-heat the hydrogen peroxide, to facilitate decomposition, using heat transferred to the first chamber by heated reaction products moving through the passageway.

9. The system of claim 1, wherein the reactor in the second chamber further comprises a fuel injector to introduce the fuel into the second chamber.

10. The system of claim 1, wherein the first and second chambers are pressure vessels sharing a common top end cap and yoke and a common bottom yoke.

11. The system of claim 1, further comprising:
    a third chamber that is a pressure vessel surrounding the first and second chambers, wherein the passageway comprises a volume bounded by an internal surface of the third chamber and external surfaces of the first and second chambers.

12. The system of claim 1, further comprising a vacuum shroud surrounding the first and second chambers that acts to reduce radiative and conductive heat loss.

13. The system of claim 1, further comprising a process control system including:
    at least one sensor to measure at least one of: temperature, pressure, mass flow, and chemical composition;
    at least one actuator to regulate at least one of: temperature, pressure, mass flow, and chemical composition; and
    an electronic controller to receive input signals from the at least one sensor and to generate output signals to control the at least one actuator based on the input signals.

14. A method of generating reaction products having elevated temperature and pressure, the method performed within a pressure vessel within which a first chamber and a second chamber are disposed, the pressure vessel having a wall and having a partition disposed between the first and second chambers, the method comprising:

decomposing hydrogen peroxide having a concentration between about 15% and about 62% by weight, in a first chamber to generate oxygen and water vapor;

combining the generated oxygen and water vapor with a fuel in a second chamber to generate a fuel/oxygen/water mixture;

catalytically combusting the mixture in the second chamber to generate reaction products having elevated temperature and pressure;

allowing the generated reaction products to exit the second chamber;

channeling the generated reaction products that exit the second chamber in a passageway between the first and second chambers, the wall of the pressure vessel and the partition to contact external surfaces of the first and second chambers to thereby transfer heat to the first and second chambers; and allowing the reaction products, having elevated temperature and pressure, to exit the pressure vessel.

15. The method of claim 14, further comprising:
providing the generated reaction products to an expansion engine to thereby generate mechanical power based on the elevated temperature and pressure of the reaction products.

16. The method of claim 14, further comprising:
decomposing the hydrogen peroxide using a catalyst that has at least two materials having differing catalytic reactivity.

17. The method of claim 14, further comprising:
catalytically combusting the mixture using a catalyst that has a stratified structure including at least two materials having differing catalytic reactivity.

18. The method of claim 14, further comprising:
pre-heating at least one of: (1) the mixture of the oxygen and fuel, and (2) the hydrogen peroxide, using at least one of:
an active heating module; and
a passive regenerative heat exchanger using heat transferred from the heated reaction products moving through the passageway.

19. The method of claim 14, further comprising:
measuring at least one of: temperature, pressure, mass flow, and chemical composition;
estimating a process state, based on the measuring, using a process control model; and
controlling at least one of: temperature, pressure, mass flow, and chemical composition based on the process state.

20. The method of claim 14, wherein the hydrogen peroxide has a concentration between about 18% and about 50% by weight.

21. The method of claim 14, wherein the hydrogen peroxide has a concentration between about 20% and about 35% by weight.

* * * * *